United States Patent [19]

Giddings

[11] 4,351,294

[45] Sep. 28, 1982

[54] FLUIDIC DIODE COMBUSTION CHAMBER

[76] Inventor: Edward H. Giddings, 1811 Woodrow Ave., Wichita Falls, Tex. 76301

[21] Appl. No.: 169,773

[22] Filed: Jul. 17, 1980

[51] Int. Cl.$^3$ ............................................. F22B 17/10
[52] U.S. Cl. .................... 123/291; 123/292; 123/261; 123/260; 123/287
[58] Field of Search ...................... 123/260–262, 123/267, 276, 279, 285–287, 291–293

[56] References Cited

U.S. PATENT DOCUMENTS

| | | | |
|---|---|---|---|
| 1,854,979 | 4/1932 | Bullington | 123/287 |
| 2,242,274 | 5/1941 | Thysse | 123/261 |
| 2,305,791 | 12/1942 | Maruhn | 123/261 |
| 3,270,721 | 9/1966 | Hideg et al. | 123/291 |
| 4,203,393 | 5/1980 | Giardini | 123/260 |

FOREIGN PATENT DOCUMENTS

| | | | |
|---|---|---|---|
| 639889 | 7/1928 | France | 123/261 |
| 55-96319 | 7/1980 | Japan | 123/291 |

Primary Examiner—P. S. Lall
Attorney, Agent, or Firm—Arthur F. Zobal

[57] ABSTRACT

A fluidic diode combustion chamber for the cylinders of an internal combustion engine. The chamber comprises a passageway having an entrance and an exit in fluid communication with the cylinder immediately above its piston. The passageway is shaped and designed such that during the compression stroke, the flow of working fluid from the cylinder to its passageway is predominantly into the entrance of the passageway. During the expansion stroke, the flow of working fluid from the passageway back to the cylinder is predominantly from the exit of the passageway. Means is provided for injecting fuel into the passageway for forming a fuel air mixture for ignition.

14 Claims, 24 Drawing Figures

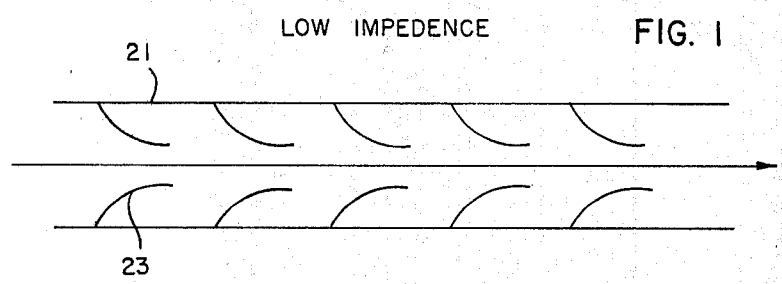
FIG. 1
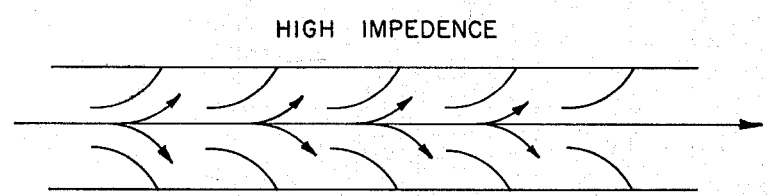
FIG. 2
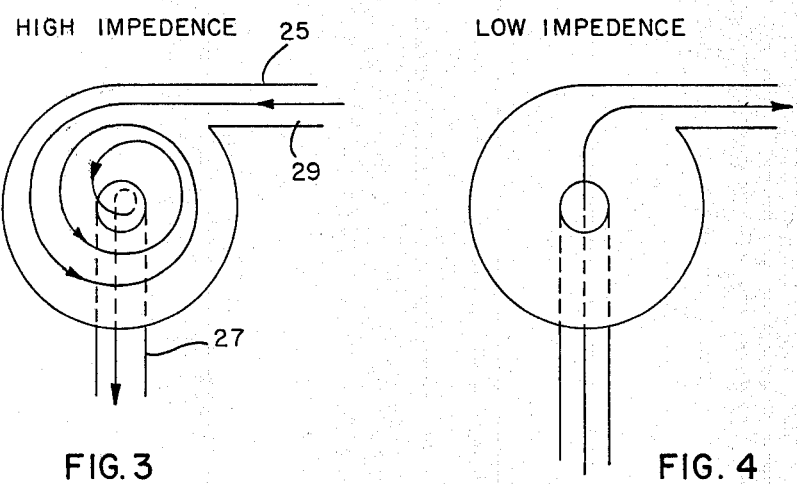
FIG. 3
FIG. 4

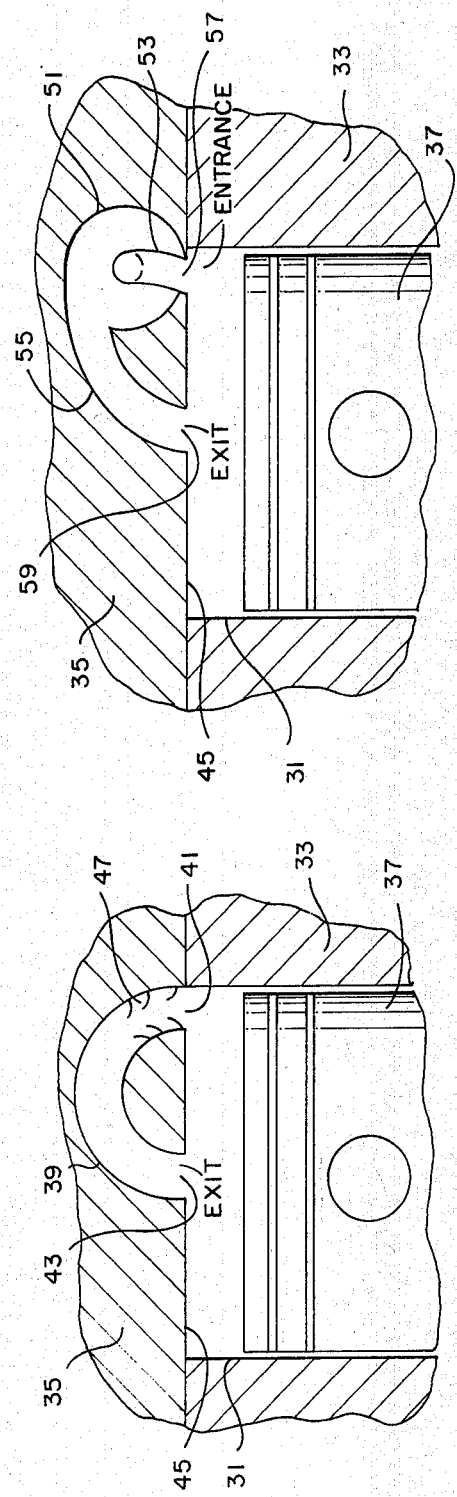
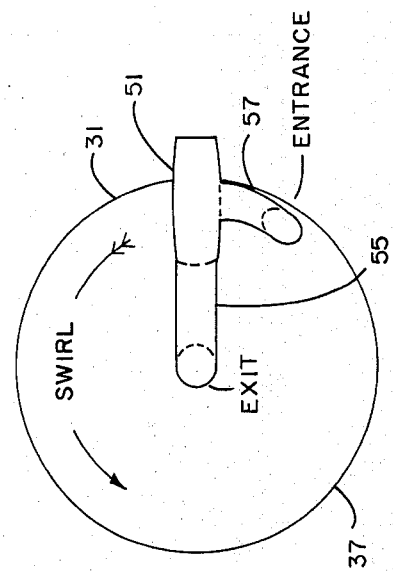
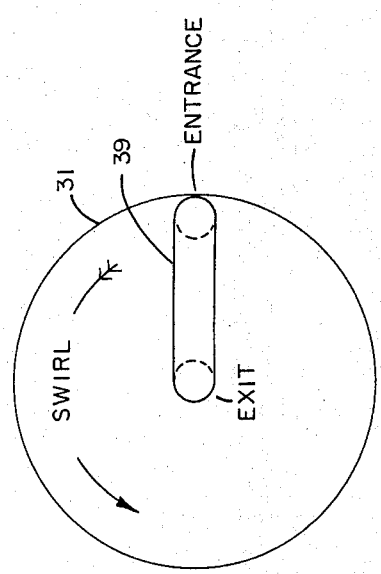

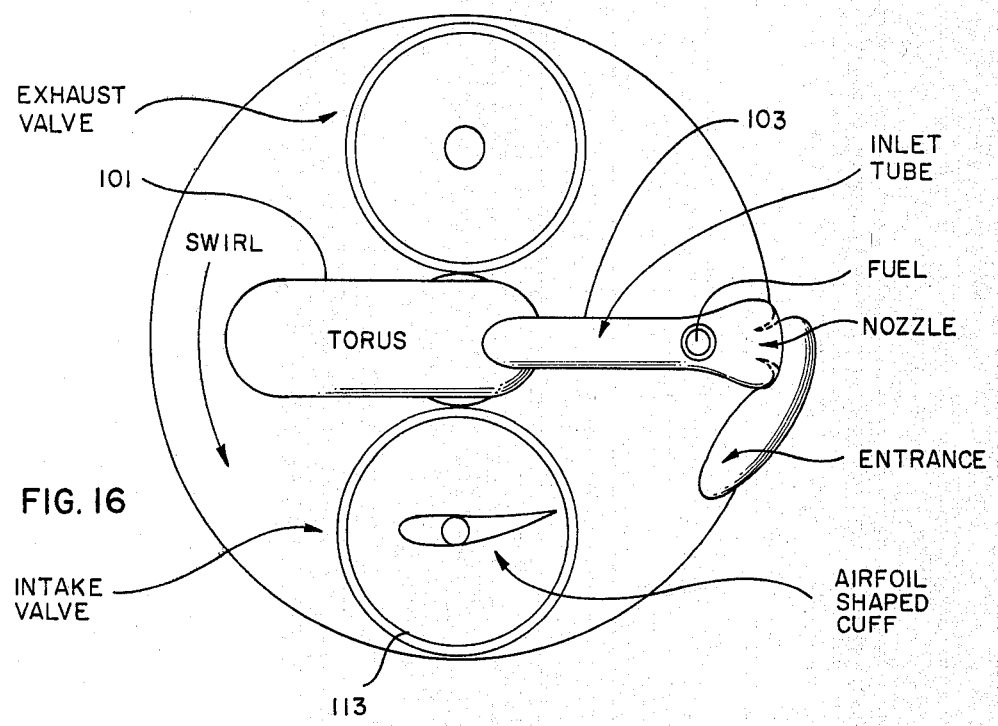
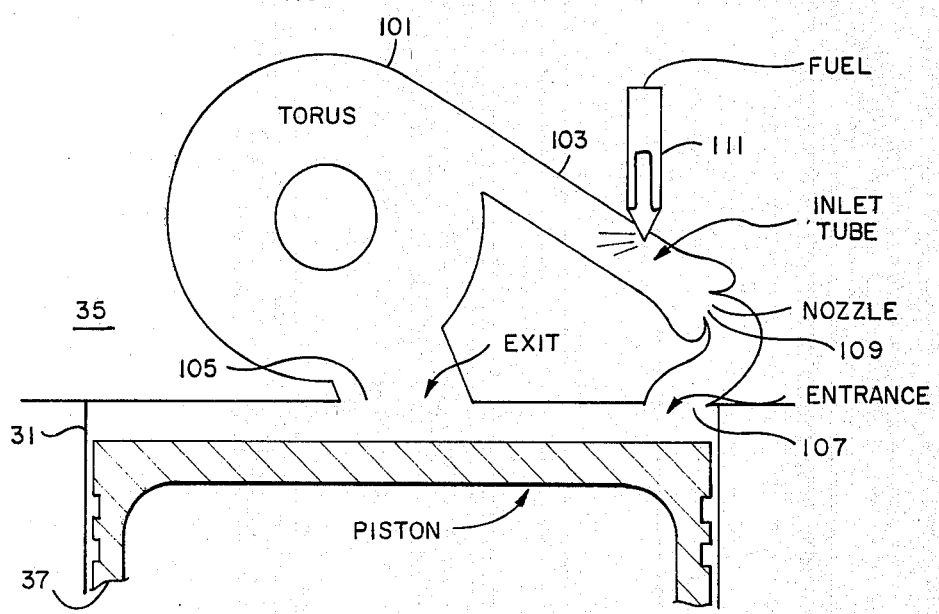

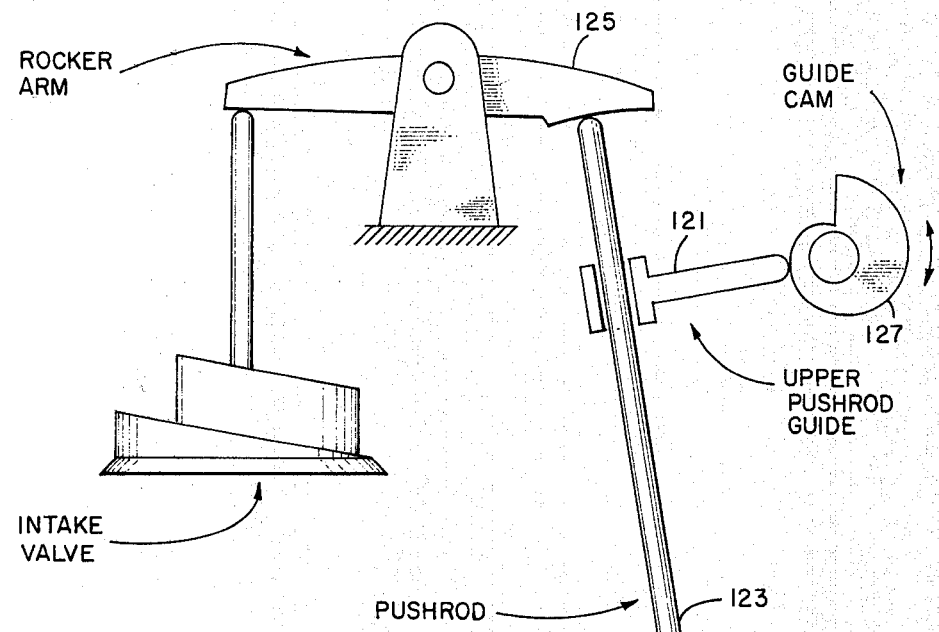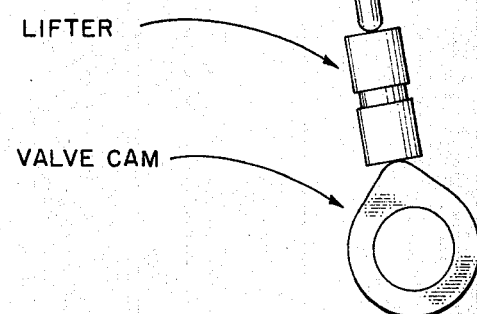
FIG. 20

FLUIDIC DIODE COMBUSTION CHAMBER

FIELD OF THE INVENTION

The present invention relates to a fluidic diode combustion chamber for the cylinders of an internal combustion engine.

DESCRIPTION OF THE PRIOR ART

Several alternative reciprocating engine types have been under development by the automobile industry in recent years in an effort to reduce exhaust emissions while at the same time improving fuel economy. Diesel engines are available for use in a few makes of cars. Honda produces a stratified charge engine of the "torch ignition" type, and Hesselman engines and engines in which the fuel is mixed with hydrogen are under active development. Each of these types has its advantages and disadvantages.

In a diesel engine, ignition, timing and rate of combustion are, by definition, controlled by the timing and rate of injection of the fuel. Injection begins shortly before top-dead-center on the compression stroke. Thus there is very little time available for vaporization and mixing of the fuel. In order to achieve high rpm in an automotive diesel, very high compression ratios (about 23:1) are used to force the vaporization and mixing to occur rapidly. The very high compression and combustion pressures make for noise and weight, and the incomplete vaporization and mixing, because of the limited time available, makes for smoke and smell.

The torch ignition engine solves the exhaust emission problem fairly well, but does little to improve fuel economy. In this type of engine a small prechamber is filled with a rich mixture and the main combustion chamber with a lean mixture. The spark ignites the rich mixture which produces a jet of flame into the main combustion chamber sufficiently hot to reliably and completely ignite a mixture otherwise too lean to burn efficiently in the time available. The average for the entire charge is normally slightly on the lean side. This engine still requires throttling to control the power setting, however, and the compression ratio is limited to the gasoline engine range.

The Hesselman type of engine avoids the need both for throttling and for extreme compression ratios. In this engine the fuel is atomized into the cylinder at some point during the compression stroke, and mixes with only a portion of the air in the cylinder. The puff of air-fuel mixture is carried by swirl or other motion of the air charge past a spark plug just in time to be ignited near top-dead-center. Such an engine has little tendency to knock and the compression ratio can be optimized for the best combination of engine weight and fuel economy. Potentially this type of engine should combine the best features of the gasoline and diesel engines. But it has been around for fifty years or so and has been under development for cars by at least two major U.S. corporations for a number of years. There are presumably difficulties in getting it to behave properly over the very wide load and speed range needed for automotive use.

The flammability limits of hydrogen are extremely wide, and thus an engine burning hydrogen can run very lean. Power output can be controlled over a fairly wide range without throttling by varying the richness of the mixture. A mixture of hydrogen and gasoline will burn leaner than gasoline alone in some proportion to the amount of hydrogen in the mixture. It is possible to convert some or all of the gasoline to hydrogen and carbon monoxide before introducing it into the engine (carbon monoxide also has a rather wide flammability range), but of course this adds complexity and expense. Efforts are being made to develop a practical system for cars based on this principle.

All of these engines burn a leaner fuel-air mixture most of the time than can be burned in the usual gasoline engine. This, of course, makes for less emisson of carbon monoxide and unburned hydrocarbons. It also means lower flame temperatures, or at least lower average flame temperatures, if the mixture is sufficiently lean. This, in turn, means lower emission of oxides of nitrogen ($NO_x$), at least beyond a certain point, although a rich mixture may also result in low $NO_x$ since nitrogen can't compete well for the limited oxygen.

Three of the four types, and these are the ones that promise substantial improvement in fuel economy, avoid (or in the case of the hydrogen-gasoline engine, partially avoid) the need for throttling. Throttling costs substantial power in low speed, around town driving. In a four hundred cubic inch engine at 1000 rpm and twenty inches of manifold vacuum for instance, five horsepower is lost irreversably in the throttling process. Considering that this is about the power required to push a typical car along at thirty miles per hour, it becomes obvious that an engine which is not controlled by throttling would have a considerable advantage in achieving good gas mileage.

Clearly there is a felt need for a reciprocating internal combustion engine which avoids the throttling of the gas engine, the need for ultra high compression ratios of the automotive diesel, and the complexity of the hydrogen system of the hydrogen burning engine. It must perform well over the very wide load and speed range required in automotive service.

SUMMARY OF THE INVENTION

It is an object of the present invention to provide a fluidic diode combustion chamber for the cylinder of an internal combustion engine for obtaining fine control of the schedule of mixing and thus fine control of the combustion process thereby minimizing the above identified problems to obtain a more efficient and better engine.

The fluidic diode combustion chamber comprises a passageway having an entrance and an exit in fluid communication with the cylinder between the head face and the piston face. The passageway is characterized such that during the compression stroke, the flow of working fluid from the cylinder is predominantly into said entrance of said passageway and during the expansion stroke, the flow of working fluid from said passageway to the cylinder is predominantly out of said exit of said passageway. Means is provided for injecting flue into said passageway for forming a fuel-air mixture for ignition. The passageway may be formed in the head of the engine or in the piston.

BRIEF DESCRIPTION OF THE DRAWINGS

FIGS. 1 and 2 illustrate the principle of the nozzle diode.

FIGS. 3 and 4 illustrate the principle of vortex diode.

FIG. 5 illustrates a nozzle diode employed to form a fluidic diode combustion chamber of the present invention.

FIG. 6 is a top view of the nozzle diode of FIG. 5 relative to the cylinder.

FIG. 7 illustrates a vortex diode employed to form a fluidic diode combustion chamber of the present invention.

FIG. 8 is a top view of the vortex diode of FIG. 7 relative to the cylinder.

FIG. 15 illustrates a fluidic diode combustion chamber for a diesel engine. Cross-hatching is not employed for purposes of clarity.

FIG. 16 is a top view of the fluidic diode FIG. 15 relative to the cylinder.

FIG. 20 illustrates one manner of varying the intake valve lift with engine speed.

THE FLUIDIC DIODE PRINCIPLE

Figure 9:
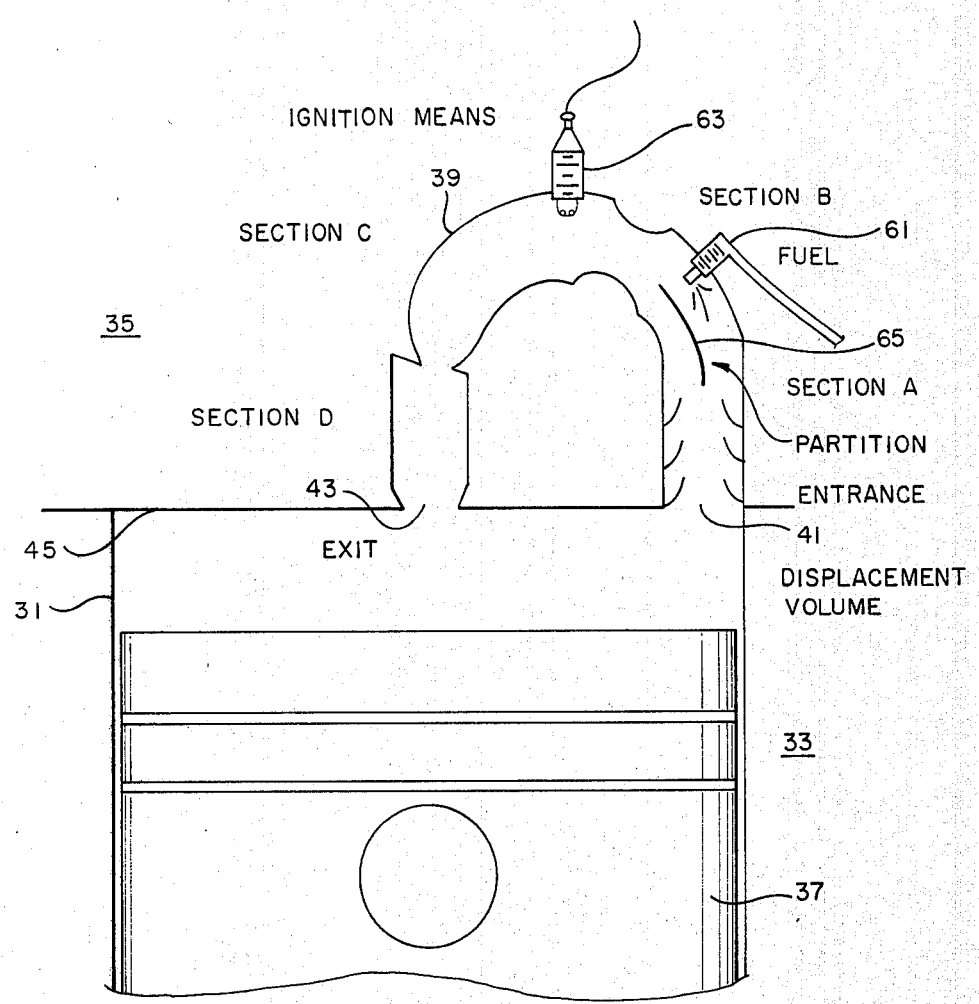
FIG. 9 illustrates one embodiment of the present invention employing a nozzle diode. Cross-hatching is not employed for purposes of clarity.

A fluidic diode is a device without moving parts through which flow of a fluid is relatively easy in one direction and relatively difficult in the opposite direction. Another way of putting it is that flow impedance is low in one direction and high in the other. There are several types of fluidic diode in use, but the two types preferably employed in the present invention are the nozzle diode, FIGS. 1 and 2 and the vortex diode, FIGS. 3 and 4.

The nozzle diode consists of a tube 21 containing a series of nozzles 23, all pointing the same way. Flow impedance is low in the direction of the nozzles and high in the direction against them.

A vortex diode consists of a more or less disc shaped chamber 25 with one axial opening 27 and one tangential opening 29. Fluid entering the axial opening can flow out of the tangential opening without much impedance, but fluid entering the tangential opening is given an initial rotational velocity. As it attempts to flow out of the chamber through the axial opening, the rotation is speeded up in the familiar vortex or whirlpool phenomenon. Flow impedance in this direction is thus very high.

DESCRIPTION OF THE PREFERRED EMBODIMENTS

The present invention relates to the use of combustion chambers which are distinct from but communicating with the open space of the cylinder chamber immediately above the piston. This open space will be defined as the displacement volume although it will normally include at least a small portion of the clearance volume; i.e., that portion of the clearance volume which is not distinct from the cylinder when the piston is at top-dead-center. The remainder of the clearance volume will be contained in the combustion chamber which is distinct from the space above the piston. All such chambers will be referred to in general as separate chambers.

In its simplest form the invention comprises a separate chamber in the form of a passageway, both ends of which communicate with the displacement volume, that is, the space above the piston. The fluidic diode principle is employed in the shaping and positioning of the separate chamber or passageway. It is so shaped and designed that during the compression stroke the flow of working fluid from the cylinder or displacement volume is predominantly into one end of the passageway. During the expansion stroke the flow of working fluid back to the cylinder or displacement volume is predominantly out of the other end of the passageway. Thus the essence of the invention is a net flow of working fluid through a passageway-like separate chamber, rather than into and out of a blind cavity as is the case with the usual separate chamber arrangement, during the compression-combustion-expansion sequence. This net flow is achieved not by mechanical valving, alternately sealing off one end and then the other of the passageway from the displacement volume, but by employment of the fluidic diode principle, that is, purely by gas dynamic means.

Thus the separate chamber(s) may be said to have an entrance (or more than one) communicating with the displacement volume and through which working fluid enters during the compression stroke. It may be said to have an exit (or more than one), also communicating with the displacement volume, through which working fluid returns to the displacement volume during the expansion stroke. Since the net flow through the separate chamber depends on gas dynamic effects rather than mechanical valves, there will be a small amount of flow into the "exit" during the compression stroke and a small amount of flow out of the "entrance" during the expansion stroke. The bulk of the working fluid, however, will flow through the separate chamber(s).

Referring to FIGS. 5 and 6 there is disclosed a cylinder 31 formed in the block 33 of an engine. Reference numeral 35 identifies the head of the engine and reference numeral 37 identifies a piston located in the cylinder. A separate chamber or passageway 39 is formed in the head 35 and has an entrance 41 and an exit 43 which open through the head face 45 in fluid communication with the cylinder 31. The passageway 39 near the entrance is provided with nozzles 47 pointing toward the exit 43 defining a nozzle diode. The air or working fluid is assumed to have been given a rotational component of velocity as it entered the cylinder or displacement volume. The "exit" of the separate chamber is centered in the head on the axis of the piston. The "entrance" is also in the head but adjacent to the wall of the cylinder. During the compression stroke any air or working fluid which attempts to flow into the "exit" will be speeded up in its rotation by conservation of angular momentum as it moves radially inward. Thus it can enter the "exit" only with difficulty. Most of the air will therefor enter the separate chamber through the "entrance". In FIGS. 5 and 6 the entrance is provided with a nozzle diode to prevent much of the working fluid from leaving the separate chamber through the "entrance" during the expansion stroke. FIGS. 7 and 8 show how a vortex diode may be used for this purpose. The vortex diode is formed in the head and comprises a disc shaped chamber 51 having an axial opening 53 and a tangential opening 55 which extend through the head face 45 at 57 and 59 in fluid communication with the cylinder 31. Thus the entrance is identified by reference numeral 57 and the exit by reference numeral 59.

A separate small diode could also be used at the "exit" if it were inconvenient to center the "exit" above the piston or to have swirl in the cylinder. Obviously there are many possible layouts of the subject invention to conform to the requirements of various engine designs. In fact, the principle is not confined to reciprocating engines, but could be applied to any positive displacement internal combustion engine.

The fundamental reason for using separate chambers in prior internal combustion engines is to achieve and control mixing of fuel with air. Mixing is accomplished during and by means of flow into and/or out of the separate chamber. Many separate chamber designs have been patented and quite a few have had commercial success in diesel, semi-diesel or oil, and other stratified charge engines over the years. Some designs have involved more than one opening or communication between the separate chamber and the displacement volume, but there has not been any mechanism provided to cause flow to proceed predominantly into one opening (or group of openings) and out another.

Any internal combustion engine in which the air-fuel mixture is inhomogeneous at the instant of ignition, and this includes diesel engines, oil or semi-diesel engines, and certain gas and gasoline engines, is called a stratified charge engine. This invention thus applies to stratified charge engines.

In a stratified charge engine the schedule of mixing exercises a primary control over the rate and character of the combustion process. Control of the combustion process is crucial in achieving complete, smooth, and rapid combustion over a wide range of air-fuel ratios, in avoiding "knock" or detonation, and in minimizing exhaust pollutants. One of the purposes of this invention is to achieve enhanced control over the mixing process, and therefor over the combustion process.

The simplest form of the invention comprises a single separate chamber which has a single entrance from the displacement volume and a single exit back to the displacement volume. It may thus be considered as a passageway through which the working fluid will flow during the compression-combustion-expansion sequence. Referring to FIG. 9, for purposes of discussion the passageway 39 may be divided into any number of sections, A, B, C, etc., with Section A immediately adjacent the entrance. In FIG. 9, a fuel injection means is shown at 61 and an ignition means is shown at 63. With the piston approximately at bottom-dead-center (BDC), fuel is introduced into section A. During this compression stroke air will flow through the entrance 41 and through section A, thereby picking up fuel. As the compression stroke continues, the air-fuel mixture generated in section A will flow through section B. Section B may be considered a buffer zone isolating section A from section C. As the piston approaches the top of its stroke, air will continue to flow into the entrance forcing the leading edge of the air-fuel mixture into section C. The ignition means 63 ignites the fuel at this point. As the piston reaches top-dead-center (TDC), the leading edge of the burning mixture will be forced into section D which is adjacent to the exit. Combustion will thus be taking place in sections C and D and the flame front will be traveling toward section B. Section A may perhaps contain only air, all the fuel having been carried at least as far as section B by the incoming air.

As the piston moves downward on the expansion stroke, the burning mixture in section D will begin to flow out the exit 43 and into the displacement volume, mixing with residual air in the cylinder as it does. The burning mixture in sections C and B will follow as the expansion process continues, the air in section A expanding, as pressure decreases, to fill the entire passageway or separate chamber.

This description of the operation of a typical embodiment of the invention makes it possible to observe some of the advantages which follow from having the working fluid flow through the separate chamber. These advantages follow from the fact that each section of the passageway may be designed to do its own particular job.

Sections A and B may be cooled sufficiently to insure that no premature ignition takes place. Thus it will be permissable to introduce fuel to section A ahead of time, as for instance at BDC, as suggested in the sketch of operation above. Sections C and D may then be operated uncooled to insure rapid combustion. The ratios of the volumes of the various sections may be so chosen that air-fuel mixture first reaches section C, and is ignited, a certain number of degrees before TDC at some given engine speed. But the fluidic diode effect will be stronger at high speed than at low speed, since it depends on kinetic effects. This means that at high speed there will be less air entering the "exit" and thus the leading edge of the air-fuel mixture will travel farther toward the exit before TDC. It will therefor arrive at section C, and be ignited, sooner. Thus there is a built in tendency for ignition timing to advance as the engine runs faster, the equivalent of the centrifugal spark advance mechanism commonly employed in gasoline engines. Thus as can be understood neither timed injection near TDC as in the diesel nor timed spark as in the gasoline engine will necessarily be required to control the timing of the ignition process. It is expected that with proper design of the separate chamber, correct timing may be built into the engine so that no auxiliary device is needed.

Thus fuel may be introduced at BDC, at least in a two stroke engine, using nothing more complicated than a check valve (or non-return valve). The fuel may enter the engine cylinder at BDC simply because pressure in the cylinder is low at BDC. Thus, if liquid fuel is used, the complexity of variable displacement, high precision, variably timed injectors may be avoided. The amount of fuel introduced may be controlled simply by controlling pressure in the fuel line.

Obviously the size, shape, temperature, etc of section A will have a bearing on the way in which the mixture of fuel and air is formed. If the fuel is introduced into section A as a liquid which will coat its walls, then this part of the separate chamber may be a simple tube. But the degree of cooling must be such that the fuel will in fact vaporize into the air as it passes through, just sufficiently to form a suitable mixture. If, on the other hand, the fuel is a gas, vapor, or ultra rich mixture, and its volume is sufficient to partially or largely fill section A, there will be a tendency for the entering air to push the fuel along in front of it without the desired degree of mixing taking place. If section A is divided longitudinally, as for instance by a metal partition 65, to form two parallel channels, then fuel may be introduced into only one of them. Only air will flow through the other. By proper design of the relative flow impedances of the two channels, the character of the mixture formed where the two channels of section A come together at the junction of sections A and B may be controlled. Many other possible arrangements will suggest themselves to one skilled in the art, the above being merely an example.

If the losses inherent in throttling are to be avoided, the engine must be able to burn a small amount of fuel in the full amount of air during part load operation. In the diesel this is accomplished by burning the fuel, insofar as possible, as fast as it is injected. Thus the puff of atomized fuel has no chance to mix so completely as to form an excessively lean mixture. A fundamental weakness of the Hesselman scheme is that at low power settings the amount of fuel required may, at least around the fringes, spread too widely between the moment of injection and the moment of ignision.

If the longitudinally divided section A of FIG. 9 is used, the injector may be positioned to introduce fuel into section A near the junction with section B. The fuel may be aimed upstream, that is, away from section B. Assuming that the amount of fuel is varied by varying the pressure of injection, the more fuel injected the more it will be dispersed toward the "entrance". Then, during the compression stroke, air entering the passageway will push the fuel into section B, simultaneously mixing it with air passing through the other channel of section A. At low power settings, the small amount of fuel required will be initially concentrated near section B because of the low injection pressure. It will be pushed into section B early in the sequence and will thus mix only with the proper amount of air before arriving at section C to be ignited.

Thus the leading edge of the fuel-air mixture can be maintained at about the optimum fuel-air ratio regardless of the amount of fuel injected. And, of course, the leading edge will enter section C, and be ignited, the same number of degrees before TDC at part load as at full load. Other arrangements can be devised to accomplish the same objective. Thus it is possible to tailor the fuel-air mixture over the full range of power settings because the fuel is confined in a passageway through which the air flows in only on direction.

Closely related to the control of mixture formation is the control of stratification. Combustion kinetics studies may suggest to one skilled in the art that it would be desirable, for instance, for the mixture to be rich at the point of ignition and taper off to lean to at the part of the mixture most distant from the point of ignition. This type of stratification has been used, for instance, in the Honda stratified charge auto engine to achieve low levels of exhaust pollution. Some other variation in the richness of the mixture might be favored for whatever reason.

If the longitudinally divided section A is used, there will be a natural tendency for the leading edge of the mixture to be rich and for the fuel-air ratio to taper off with continued flow through the entrance. This is because the first increment of vapor or gas will be pushed from one channel of section A without much opportunity for mixing until it reaches section B. By varying the shape and layout of section A this tendency may be enhanced, eliminated, or reversed, at the option of the designer.

It is desirable to be able to control the rate of combustion of the fuel, particularly in order to limit the maximum rate of pressure rise. Indeed, most of the rationale for the diesel type of high pressure, precisely timed fuel injection is that the rate of introduction of fuel controls the rate of burning. The diesel is only partially successful in achieving this aim, however, since there is a tendency for the ignition lag to become the controlling factor in high speed engines. Most or all of the fuel may be injected before ignition takes place. The fuel may then burn excessively rapidly. In severe cases destructive "knocking" may occur. Diesels are notoriously noisy for a while after a cold startup because the physical and chemical lags are longer in the cold engine.

The physical lag, the time delay while the fuel evaporates, which occurs in a diesel may be avoided in an engine such as suggested above. This is because the fuel can be introduced 180° or so ahead of TDC and will have time to evaporate before the piston approaches TDC. Rate of combustion may therefor be better controlled in such an engine (by rate of mixing) than in a diesel. It might also be desirable, however, to restrict combustion to sections C and D of the separate chamber and to the displacement volume. This would put additional restraints on the rate of pressure rise.

The maximum rate of flame propagation in an internal combustion engine is of the order of 200 feet per second or less. If section B is necked down so that the rate of flow through the smallest cross section or throat of a venturi is 200 feet per second or so during the later stages of the compression stroke, then the flame front will not be able to move upstream toward section A. Thus section B can be designed to act as a barrier to excessively rapid combustion.

The desirability of exercising control of mixing and thus of combustion does not end even with completion of the first stage of the combustion process. An example of an effort to continue controlling the combustion process is the "air cell" type of diesel engine. In this design air is trapped in a separate chamber at TDC. This air expands back out of the separate chamber during the expansion stroke. If the engine is near full power, that is if the overall air-fuel ratio is near the chemically correct ratio, then the burning mixture is initially very rich and is progressively diluted by the air issuing from the air cell. The result is said to be a late but smooth combustion process.

Delaying the combustion very much will naturally result in a loss of efficiency. Still it is evidently desirable from the point of view of smoothness to start with a rich mixture and add air in stages during the early part of the expansion process. A rich burn followed by dilution after some initial expansion is also a very good way to reduce $NO_x$ production, which is currently a matter of concern to auto makers. $NO_x$ production is low in an extra rich combustion process because the flame temperature is lower than in a correct mixture, of course, but it is low primarily because the nitrogen cannot compete well with the extra carbon monoxide and hydrogen for the limited amount of oxygen available. The burning mixture cools itself by doing work on the piston during the expansion process and as the temperature falls more air may be added.

Since not all the working fluid, as a practical matter, will be in the passageway and mixed with fuel at TDC, there will be a tendency for any engine operating approximately as described in the example to start with a rich mixture when operating at or near full power. Since all of the fuel is introduced into section A but not all the air in the charge can be made to pass through section A, the air that does, will pick up more than its share of fuel. Thus a rich mixture will flow through section B and be ignited in section C.

Some air will enter the "exit" during compression, since the fluidic diode effect is not 100% efficient. This air, held in section D at TDC, will begin to flow out the exit at the beginning of the expansion stroke. At the same time the burning rich mixture will be flowing into section D from section C. Whether the air and burning mixture mix within section D or whether the air is simply pushed out the exit ahead of the mixture will obviously depend on the shape of section D. If sections C and D together form a simple cylinder, there will be little mixing. If section C is necked down into a nozzle shape as it leads into section D, and if it is aimed away from the "exit" into the displacement volume but positioned so as to cause maximum swirl and turbulence in section D, there will be a great deal of mixing.

If the compression ratio is twelve to one, for instance, the volume available to the working fluid is doubled during the first one-twelfth of the expansion stroke. Thus the working fluid will flow out of the passageway quickly during the first part of the expansion. The space available between the piston face and the head will be a thin disk at first. The burning mixture will move radially outward, mixing with any residual air above the piston and with the air from the exit and section D.

Thus, burning may be considered to occur in three stages. The first stage occurs with the passage of the flame front through the original mixture as it passes through section C. This mixture may be stratified, that is it may graduate from rich to lean for instance, if the designer so wishes. The second stage of combustion occurs when the burning mixture enters section D and mixes with the air there or passes through section D picking up air as it goes. Some expansion will be taking place as this occurs. Finally, the burning mixture enters the displacement volume and mixes with whatever air is there. The behavior of these stages of combustion depends on the shape and design of the separate chamber and thus may be controlled to a very considerable extent by the designer.

Figure 11:
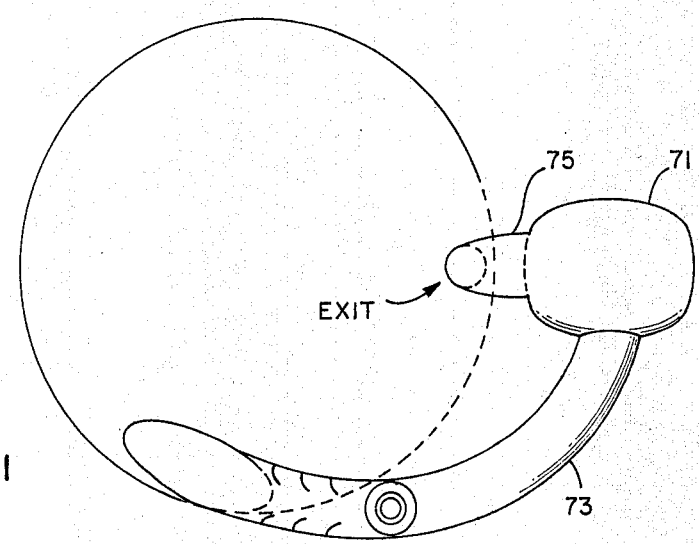
FIG. 11 is a top view of the fluidic diode of FIG. 10 relative to the cylinder.
Figure 10:
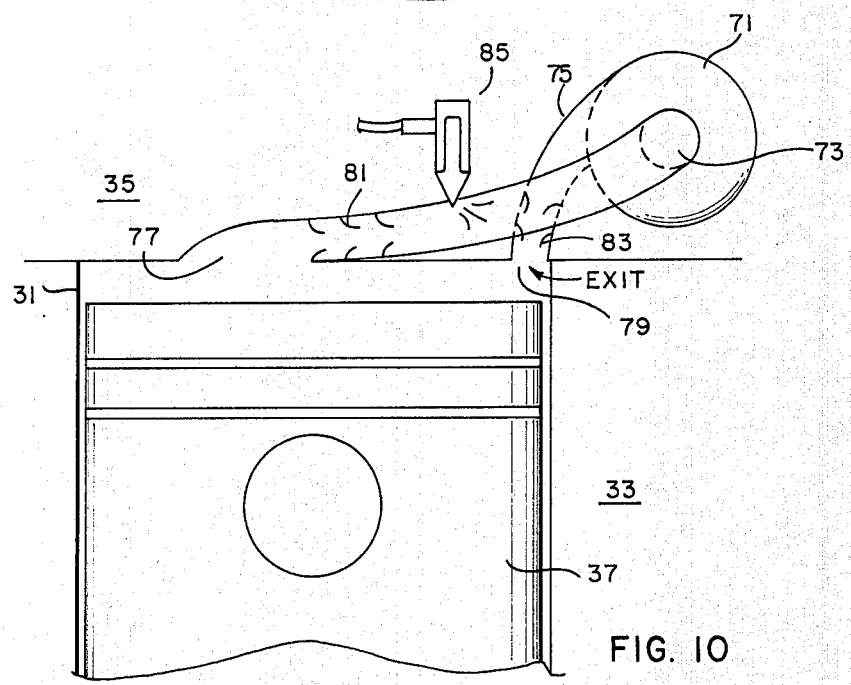
FIG. 10 illustrates another embodiment of the present invention wherein the exit of the fluidic combustion chamber is near the wall of the cylinder. Cross-hatching is not employed for purposes of clarity.

If it is not convenient to center the "exit" in the cylinder head, as for example because it would interfere with the valve layout of an existing design, then additional fluidic diodes may be used as shown in FIGS. 10 and 11. The passageway shown comprises a disc shaped chamber 71 having an axial opening 73 and a tangential opening 75. The axial opening extends through the head face at 77 near the cylinder wall defining the entrance. The tangential opening extends through the head face at 79 near the cylinder wall defining the exit. Nozzles 81 and 83 are provided in the passageway pointing toward the exit 77. The nozzles 83 are used to minimize flow into the passageway through the "exit" during the compression stroke. A vortex diode doubles as the (roughly) spherical, uncooled combustion chamber and also helps prevent reverse flow during the expansion stroke. Reference numeral 85 identifies a fuel injection nozzle.

Figure 13:
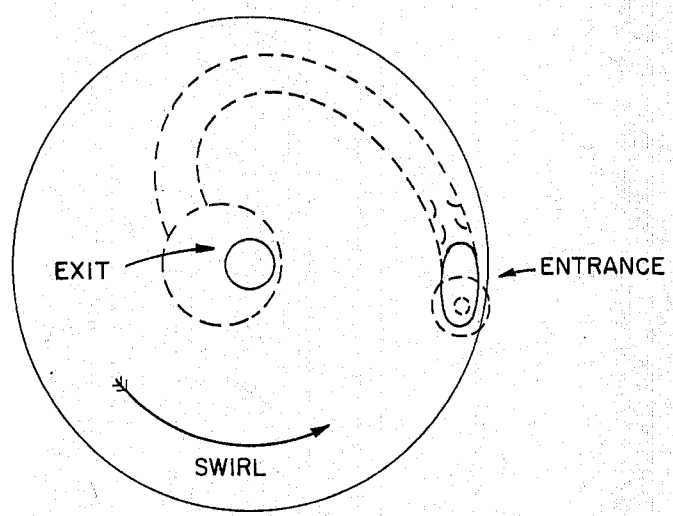
FIG. 13 is a top view of the fluidic diode of FIG. 12 relative to the piston.
Figure 12:
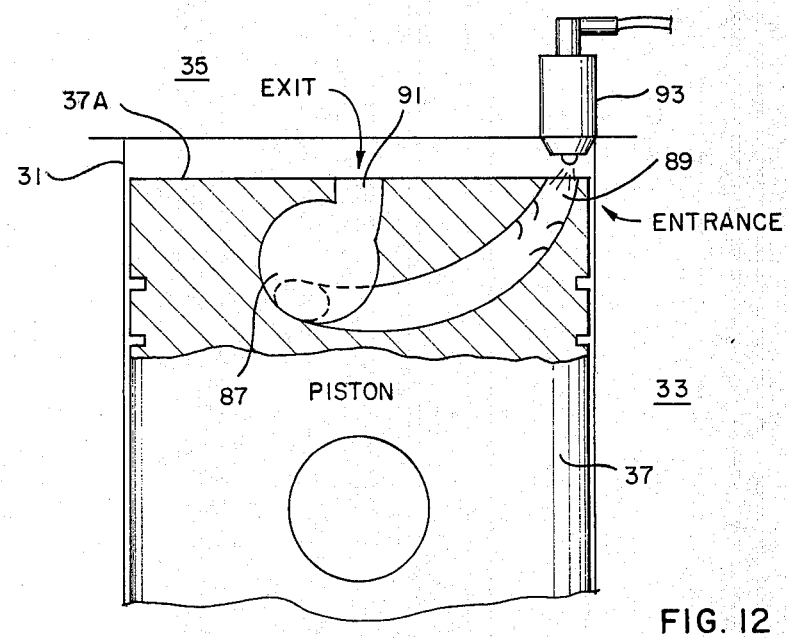
FIG. 12 illustrates a fluidic diode combustion chamber in the piston.

FIGS. 12 and 13 illustrate another embodiment wherein the separate chamber of passageway is built into the piston. The passageway comprises a chamber 87 having an entrance 89 and an exit 91 extending through the piston face 37A. Reference numeral 93 identifies a fuel injection nozzle.

Current diesel engines are not well suited to powering automobiles. The rate of combustion in a diesel is controlled by the rate of which fuel is injected. In existing diesel engines, the injection of fuel into the air charge is essentially a batch process. Unfortunately there is a time delay, varying inversely with temperature, pressure, and turbulence but on the order of two milliseconds, between injection and ignition of the fuel. If the start of injection is advanced very much to compensate for high engine speed, too much mixture will form before ignition. If some of this mixture becomes roughly homogenous before ignition it will ignite all at once and severe "knock" or detonation will result. Thus it is not permissible to begin injection very many degrees before top-load-center, and the top speed of the engine is correspondingly limited.

Truck diesels normally have a compression ratio of about 16 to one, and have open combustion chambers. They achieve a top speed of no more than about 2200 rpm. Automobile diesels are capable of speeds up to around 4000 rpm, and thus of much higher specific output (horsepower per cubic inch). But in order to attain this rpm they are designed with compression ratios on the order of 23 to one and with separate combustion chambers of the turbulence chamber type. There is considerable fluid friction associated with the very high velocity of flow into the narrow neck of the turbulence chamber, and this causes an increase in the work of compression. The turbulence chamber is also a source of extra heat loss, and the high compression ratio promotes low mechanical efficiency. The high compression ratio also tends to make it difficult to modify gasoline engine designs for diesel operation.

Two other factors may limit the use of diesel engines in cars. Although they tend to produce relatively little carbon monoxide and unburned hydrocarbons, existing diesel types produce more oxides of nitrogen than proposed future standards would allow. They also produce particulate matter, or soot, which is suspected of being a health hazard.

This diesel embodiment of the fluidic diode combustion chamber of FIGS. 15 and 16 avoids this difficulty by progressively adding fuel to a moving column of air in a flow process. Each successive increment of the mixture thus formed must necessarily ignite at a later instant in time than the previously formed mixture.

To understand the principle of operation of the embodiment consider the following. Assume that air is flowing down a tube at the temperature and pressure characteristic of the air charge in a diesel engine near top-dead-center. That is, assume the air is sufficiently hot and compressed to evaporate and ignite, in about two milliseconds, any fuel atomized into it. At some point in time and at some point along the tube let fuel be atomized into the air. Assume that the air is flowing down the tube at a speed of four inches per millisecond (333 ft/sec). Obviously, the fuel-air mixture would ignite eight inches down the tube.

The rate of flame propagation is known to be only on the order of one to two hundred feet per second in high compression gasoline engines, even with intense turbulence. Thus ignition in the tube would not depend on the usual flame propagation phenomenon. Flame could not move fast enough to propagate upstream, and the ignition zone would therefor be stationary in the tube as long as fuel and air continued to be supplied. It would remain eight inches down stream from the point of introduction of the fuel.

Now if fuel injection into the tube were continued for a period of 1.5 ms, then it is clear that the ignition process would begin half a millisecond after fuel injection was ended and would continue for 1.5 ms. Obviously no "knock" or detonation phenomenon, in which a volume of fuel-air mixture ignites all at once, could occur under these circumstances, even though the injection was "advanced" ahead of the ignition process to the point that there was no overlap. The time required from ignition of the first increment of fuel to ignition of the last increment would depend on the duration of injection even more directly than in a typical diesel engine.

If the temperature and pressure of the air flowing through the tube were increased during the injection and afterwards, the ignition lag of the fuel would be shortened, even as it burned. In this case the ignition zone would move upstream toward the injection point in some proportion as the ignition lag decreased. The duration of the ignition process would be somewhat less than 1.5 ms. Still, no "knock" would occur since it would still take a finite and nearly equal time for each successive increment of fuel to evaporate, mix, and ignite.

Figure 14:
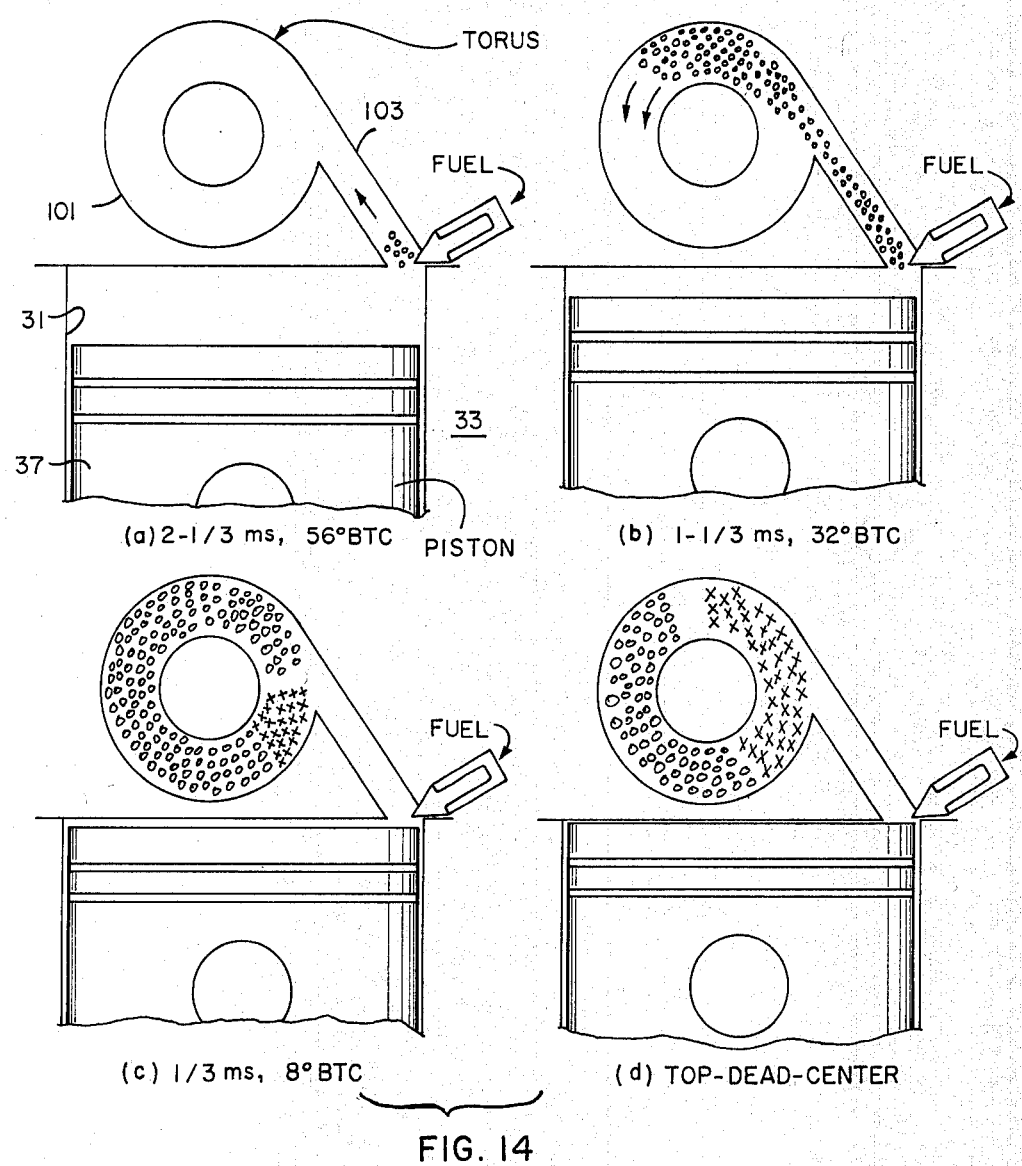
FIGS. 14A–14D illustrate the ignition sequence in a torus at 4,000 rpm.

In order to approximate this combustion scheme in an engine process, and to make as much of the air charge as possible available for combustion, it is convenient to bend the tube, and thus the moving air column, around into a ring or torus. Air from the cylinder may be forced tangentially into a toroidal combustion chamber during the compression stroke (see FIG. 14). In FIG. 14, the small circles in the torus 101 denote the fuel-air mixture and the small x's denote ignition. The momentum of the air entering this chamber will cause a rotational flow around the torus as the piston approaches top-dead-center.

The droplets of fuel might be spun out against the outer wall of the torus by centrifugal force if introduced directly into the rapidly rotating air. Therefor a straight length of inlet tube 103 is provided to give the fuel a chance to partially evaporate before it enters the torus. Atomization can be as fine as possible in this scheme. The "penetration" parameter which is so important in orthodox diesel engines, mixing produced by momentum of the fuel droplets, is not a consideration here. Turbulence resulting from the flow of air around the torus will ensure thorough mixing of air and fuel.

Assume that the circumference of the torus is six inches. If fuel introduced into the inlet tube requires half a millisecond to reach the torus, and if the air in the torus makes a revolution in 1.5 ms, then ignition will occur in an increment of mixture after it has made just one revolution in the torus. If the duration of injection were 1.5 ms, the mixture would just fill the torus at the instant of first ignition. Actually there will be some smearing out of the mixture because of turbulence in the torus. Also, it is desirable to leave a narrow gap of air between the beginning and the end of the mixture column. Thus the speed of flow around the torus should be somewhat less than four inches per millisecond. Alternatively the torus could have a greater circumference or the duration of injection could be shortened.

FIG. 14 shows the sequence of events in terms of milliseconds and of degrees before top-dead-center (°BTC) at an assumed engine speed of 4000 rpm (24° crank angle/millisecond). The ignition lag is assumed to decrease to 1.5 ms at the end of the ignition sequence because of continued compression by the piston and by early heat release from the first increment of fuel to ignite. The zone of ignition thus moves 120° upstream around the torus during the ignition process.

The trouble with this scheme is that it would only work at some one engine speed. The speed of the air flowing around the torus would vary approximately as engine speed. Thus if it took 1.5 ms to make one revolution around the torus at 4000 engine rpm, it would take 3 ms at 2000 rpm. 6 ms at 1000 rpm, and so on. An additional objection is the unwanted heat transfer from the toroidal combustion chamber. Since the chamber would contain mostly either burning mixture or combustion products all the time except during the latter part of the compression stroke, it would have to be cooled. Contrary to intuition the toroidal combustion chamber has only about half again the surface area of a sphere of equal volume, but heat loss is a serious problem even in the spherical turbulence chamber of the usual automobile diesel.

Referring to FIGS. 15 and 16, the toroidal combustion chamber 101 is open to the cylinder 31 at the center of the cylinder head face at 105 as shown. The inlet tube 103 is still employed to conduct air into the torus during the compression stroke, but the burning mixture returns to the cylinder through the center of the head face. Air is largely prevented from entering the torus at the center of the head face (the "exit") becuase swirl is provided in the cylinder by the intake valve or port. Thus during the compression stroke, pressure in the center of the cylinder, the "eye" of the swirling air column, is lower than pressure near the cylinder wall. Early in the expansion stroke the burning mixture is prevented from flowing back through the inlet tube by its own momentum around the torus. To flow back through the inlet tube it would have to make a sharp turn of almost 180°. In addition, the point at which the inlet tube communicates with the cylinder, the entrance 107, is provided with a nozzle diode 109 to prevent reverse flow. Reference numeral 111 identifies a fuel injector.

Thus there are three mechanisms employed to promote unidirectional flow through the passageway-like separate chamber. Swirl in the cylinder makes the cylinder act as a vortex diode during the compression stroke. The inlet and outlet of this vortex diode are short circuited through the passageway or separate chamber and thus it promotes unidirectional flow. Second, early in the expansion stroke the momentum of the burning mixture encourages flow out the exit 105 and into the cylinder 31 but discourages reverse flow back through the inlet tube. Thus the torus itself acts as a fluidic diode. Finally, later in the expansion stroke when pressure begins to drop, the nozzle diode 109 situated at the entrance 107 discourages expansion of trapped air out the entrance and thus promotes its expansion into the torus.

A small portion of the air charge is trapped in the nozzle diode and inlet tube at top-dead-center and during the early part of the expansion stroke. Later in the expansion stroke, as pressure in the system falls, much of this air will expand into the torus, displacing most of the combustion products there. Thus the torus will contain a burning mixture and hot gasses for only 120° or so out of the 720° of a four-stroke cycle. It should therefor not be necessary to cool the toroidal combustion chamber in a four-stroke engine, and heat loss from this source will be nearly eliminated.

In order to maintain the rate of rotation of air around the torus approximately constant despite varying engine speed, some air is allowed to enter the exit at the higher engine speeds. This air will share the momentum of the air in the torus and thus reduce its speed. It would be possible to use fluidic means to limit the velocity of flow through the inlet tube, and this would have the effect of forcing air to enter the exit at high engine speed. But an intake valve arrangement which provided enough swirl to give the desired rate of rotation of air around the torus at low engine speed would produce a large excess of swirl at high rpm. This would tend to reduce volumetric efficiency and to waste energy. Thus it is better to use a variable "lift" intake valve designed to produce the swirl needed at each rpm with the minimum constriction of entering air at that rpm.

Figure 18:
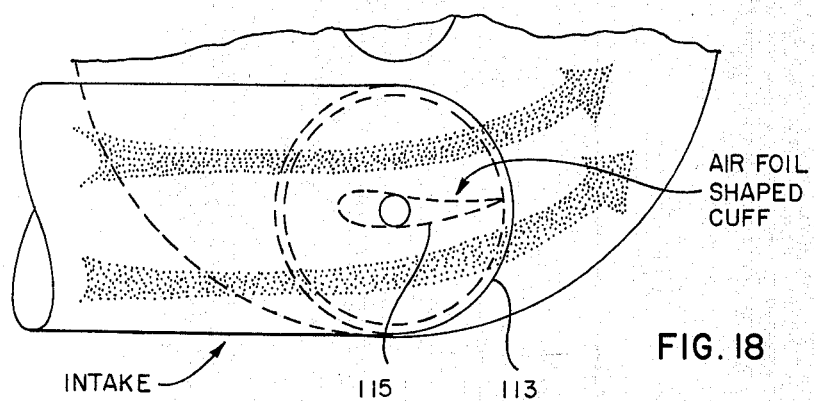
FIG. 18 is a top view of FIG. 17.
Figure 17:
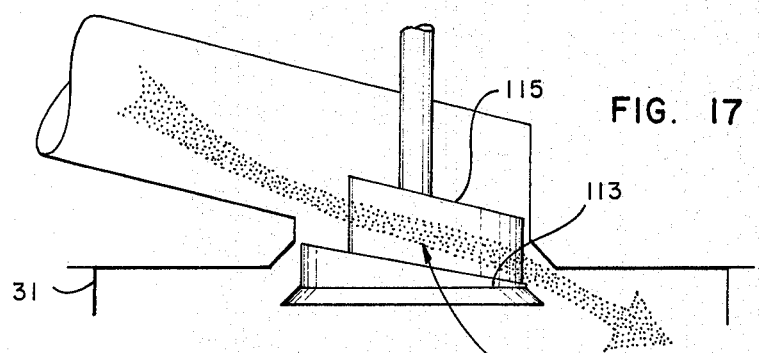
FIG. 17 illustrates a wedge shaped intake valve.
Figure 19:
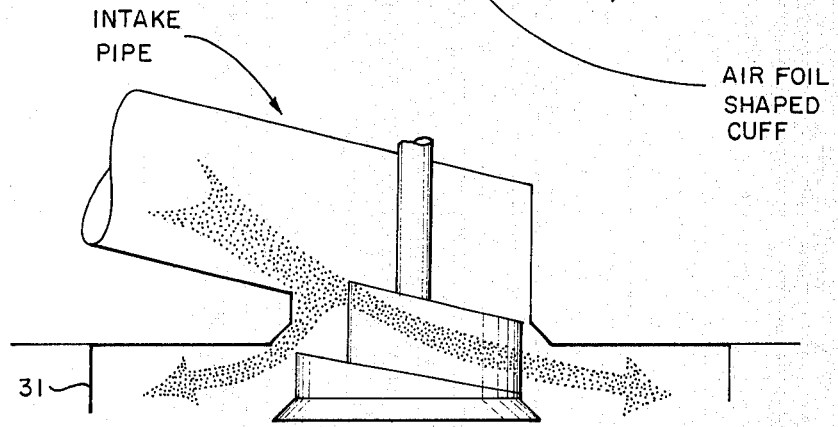
FIG. 19 illustrates the intake valve of FIG. 17 with a different valve lift.

A shrouded or wedge shaped intake valve, as shown at 113 in FIGS. 17-19, will produce a relatively intense swirl in the cylinder in proportion to engine speed when it is only opened a small amount as shown in FIG. 17. All the entering air is forced to flow into the cylinder on one side of the valve and with maximum tangential velocity.

If the valve is opened farther, as shown in FIG. 19 and as it would be at higher engine speed, some air can enter in the opposite direction and partly cancel this tangential velocity. In this way a relatively small increase in the opening, or lift, of the intake poppet valve with increasing engine speed will prevent what would otherwise be a linear increase in swirl velocity with increasing engine rpm. By controlling intake valve lift, swirl can be made to vary as any desired function of rpm, for instance as the square root of rpm.

It can be shown mathmatically, for the idealized case of "free vortex" rotation of air in the cylinder and neglecting fluid friction in the "entrance", that the velocity of air at the throat of the "entrance" will equal the tangential velocity of swirl at the radius of the lip of the "exit". In a free vortex the tangential velocity varies inversely as radius. Thus the tangential component of velocity at the radius of the "exit" lip will be on the order of two or three times the average tangential velocity of air entering through the intake valve. The intake valve 113 is shown in FIGS. 16-19 with an airfoil shaped cuff 115 on the stem which is intended to minimize turbulent mixing of the entering air streamline and thus promote the formation of a free vortex.

The average velocity of the air entering the cylinder during the intake stroke is known from the engine displacement, the rpm, and the dimensions of the opening. From this, the velocity distribution in the free vortex, and thus the velocity of air in the throat of the "entrance", may be calculated. Ideally this velocity is constant throughout the compression stroke. The mass rate of flow into the "entrance" therefor depends only on the varying density of the air in the cylinder.

With the velocity of flow at the "entrance" known, the minimum cross sectional area (throat) of the "entrance" required to transfer the air charge to the separate chamber may be calculated.

The volume rate of flow from the displacement volume to the clearance volume is simply the piston speed times the piston area times the ratio of clearance volume to total volume in the system at any instant. This rate of flow can be plotted against crank angle and the "entrance" throat area can be sized to accommodate the maximum flow. Ideally, all the air would then enter the "entrance" during the compression stroke, and much of the time a small amount of air would be flowing out the "exit" into the low pressure eye of the swirl vortex. With constant intake valve lift, this relationship would be the same at all engine speeds.

If the "entrance" throat is sized to accommodate the entire flow of air into the separate chamber for a valve lift on the order of half the maximum, then opening the valve fully will result in a substantial flow of air into the "exit" because of the greatly reduced intensity of swirl, and this will be true at any engine speed. In fact, even if all the air continued to enter the cylinder tangentially, doubling the lift would cut the swirl velocity, and thus the velocity through the throat of the "entrance", by half. Thus half the air would have to enter the "exit" and the speed of rotation of air around the torus would be reduced by seventy-five percent. With an intake valve designed as in FIGS. 16-19, the effect of varying the valve lift will be greater still.

Since a modest range of variation in intake valve lift will permit a wide range in the ratio of flow velocity around the torus to engine rpm, it will be possible to maintain the flow around the torus about constant in spite of widely varying engine speed. Injection may therefor begin, for instance, two milliseconds plus 8° crank angle before top-dead-center, and continue for, for instance, 1.5 ms, quite irrespective of engine rpm.

The effectiveness required for the "entrance" nozzle diode, if the torus is to be scavenged of combustion gases by air from the inlet tube, depends not only on the ratio of inlet tube volume to torus volume but also on the ratio of throat area of the "exit" to that of the "entrance". The "exit" might reasonably have a diameter 20% that of the engine cylinder, or 0.8 inches in a four inch bore cylinder, for instance. Assuming four inch bore and stroke, pure tangential flow from a 1.5 inch intake valve causing an ideal "free vortex", and a minimum valve lift of one-third inch at low engine speed, the ideal throat area of the "entrance" may be calculated as only about 12.5% the throat area of the "exit". In an actual engine a somewhat larger "entrance" throat area would be required for the same flow because of fluid friction at the "entrance" etc.

Nevertheless, it is clear that the "entrance" diode need not be especially efficient because most of the flow would be out the "exit" even without any diode effect at all, just because the "exit" is so much larger. A single nozzle, as is shown in FIG. 15 for the sake of simplicity, would behave like a "Borda mouthpiece" or a re-entrant orifice. The behavior of such a device is known. It has a discharge coefficient, in what we are calling the reverse direction, of 0.5. In other words a single nozzle would cut the effective "entrance" area in half during reverse flow, and thus might well be adequate. Neglecting the effects of temperature differences, the flow out the "entrance" would only be on the order of 8.5% of the flow out the "exit" with a single nozzle and an area ratio of six to one, for instance.

If the inlet tube contained 15% of the air charge at TDC, then about half of this air would expand into the torus during the later part of the expansion stroke. Thus would displace the combustion gases and cool the torus. A more effective entrance diode would provide more air for scavenging the torus or permit the use of a smaller inlet tube and diode volume.

Since combustion effectively ceases in an engine a relatively short time after top-dead-center, most of the air trapped in the inlet tube will not be available to the combustion process. On the other hand, by filling the separate chamber during the intake stroke, this air displaces what would otherwise be the clearance gas fraction. Thus the net air availability of the embodiment should compare favorably with that of other separate chamber engines.

FIG. 20 illustrates a convenient method for varying intake valve lift with engine speed. A cam actuated upper pushrod guide 121 is provided which varies the leverage of the pushrod 123 on the rocker arm 125. The angular position of the cam 127 is assumed to vary as a fuction of engine speed. The advantage of using a cam is that the optimum lift can be determined experimentally at each engine speed and the cam may be cut accordingly. The optimum cam profile might well contain irregularities to compensate for tuning effects in the intake manifold at certain engine speeds of whatever. A linear cam could also be used and would perhaps be simpler to build. Either could be centrifugally actuated like the centrifugal spark advance mechanism on a gasoline engine.

Figure 21:
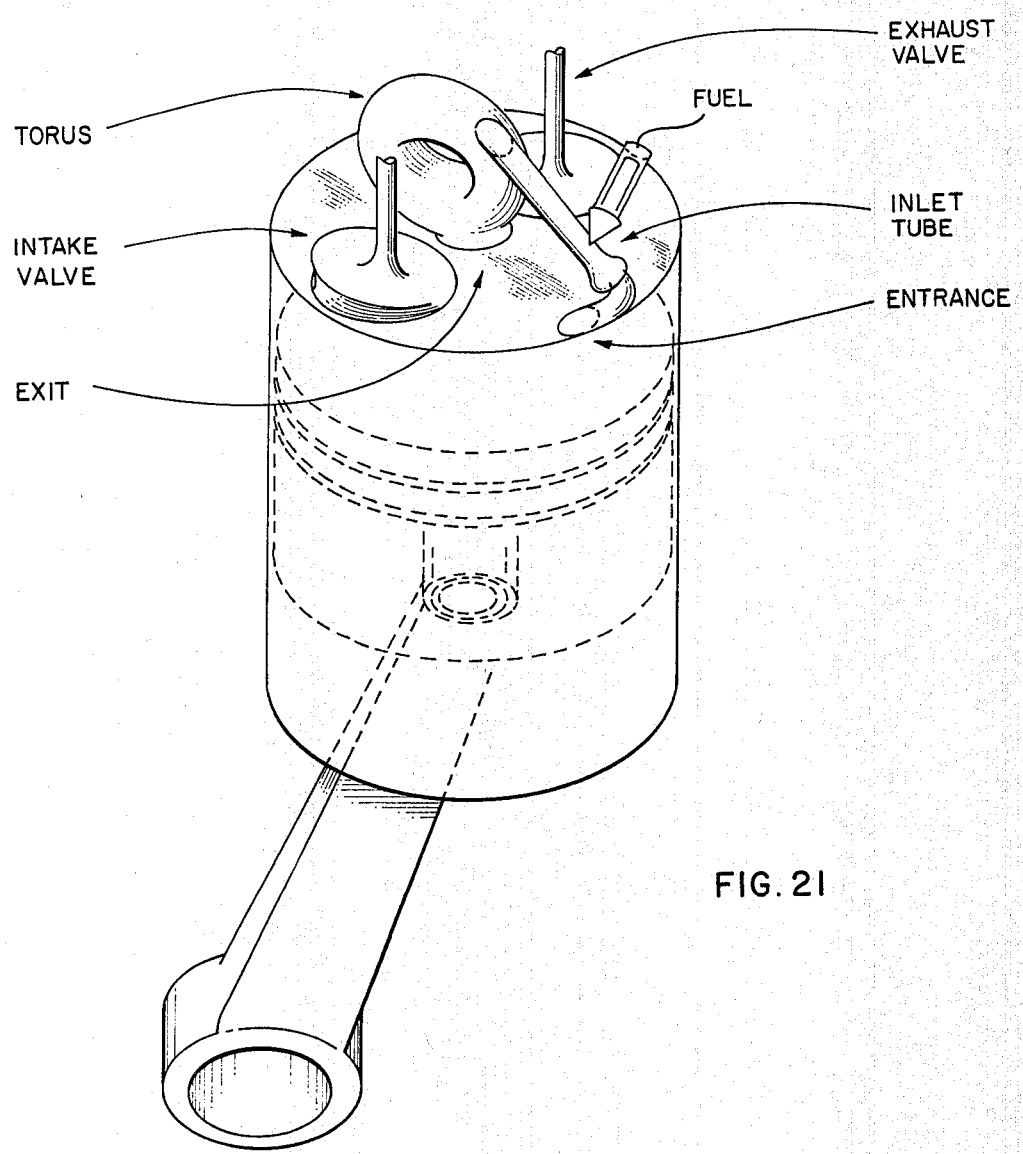
FIG. 21 is a perspective view of a fluidic diode combustion chamber and valves of a four stroke engine.

FIG. 21 is a perspective view of the separate chamber and valves for a four stroke version of the embodiment of FIGS. 15 and 16.

Because the injection of fuel can be advanced to compensate for ignition lag, an engine built according to the embodiment of FIGS. 15 and 16 will not be limited in rpm. Specific output may therefor be high and a smaller and lighter diesel engine, operating most of the time nearer its optimum power setting, may be installed in an automobile than would otherwise be possible. Neither ultra high compression ratio nor intense turbulence in a swirl chamber is needed to achieve this result.

In a gasoline engine, oxides of nitrogen are at a maximum when a slightly lean mixture is burned. The amount of $NO_x$ formed decreases rapidly as the mixture is made leaner, made richer, or is diluted with exhaust gas to reduce the flame temperature. Thus the conditions that favor $NO_x$ formation are high temperature and available oxygen. In a diesel engine the mixture is inhomogeneous during combustion. Zones of air or lean mixture alternate with zones of rich mixture. Thus locally high temperature may coincide with locally high oxygen concentration to produce excessive $NO_x$. In an engine built according to the embodiment of FIGS. 15 and 16 most of the mixture in the torus will be locally homogeneous as it ignites. In an automobile engine, operating most of the time at low power settings, it will usually be quite lean. At full power it will be fairly rich. Thus the tendency to produce $NO_x$ will be sharply reduced.

The production of smoke or sooty exhaust by diesel engines is usually attributed to the combustion of zones of excessively rich mixture. In an engine built according to the embodiment of FIGS. 15 and 16, vaporization of the fuel and thorough mixing with adequate air before ingition will prevent this from occurring.

Since the compression ratio of the embodiment of FIGS. 15 and 16 may be in the low diesel range, rather than about 23 to one as in orthodox automobile diesels, peak pressures will be relatively low.

Combustion will be smoother, and therefor less noisy, in engines built according to the embodiment of FIGS. 15 and 16 because the fuel vapor is well mixed with air before ignition. Also avoided will be the characteristic diesel smell which is said to result from the burning of excessively rich zones of mixture followed by quenching by rapid expansion.

The embodiments of FIGS. 10, 11, 12, 13, 15, 16 and 21 are directed to diesel or compression ignition embodiments which require no discrete ignition means. Spark-plug or glo-plug ignited versions of these embodiments may be employed, however. In FIG. 10, a glo-plug may be provided in chamber 71 facing the mixture entering from 73. In FIG. 12, a spark plug with long electrodes may project into the cavity in the piston as the piston approaches top dead center as in the case of the experimental Ford "Proco" engine. In FIGS. 15, 16 and 21, a glo-plug may be provided at the top of the torus. In FIG. 21, the airfoil shaped cuff 115 has been omitted although it is to be understood that it may be employed as in FIGS. 16–20.

I claim:

1. In an internal combustion engine having a cylindrical chamber formed in its block and a piston supported to reciprocate in the cylindrical chamber and wherein the cylindrical chamber has a wall formed by the head of the engine which the face of the piston moves toward and away from during the compression and expansion stroke respectively of the piston, the improvement comprising:

a passageway having an entrance and an exit in fluid communication with the cylindrical chamber, said passageway being characterized such that during the compression stroke, the flow of working fluid from the cylindrical chamber is predominantly into said entrance of said passageway and during the expansion stroke, the flow of working fluid from said passageway to the cylindrical chamber is predominantly out of said exit of said passageway, and means for injecting fuel into said passageway for forming a fuel-air mixture for ignition.

2. The improvement of claim 1 comprising:

nozzle means located in said passageway pointing in the direction of said exit whereby fluid flow impedance is low in the direction to which said nozzle means is pointing and high in the opposite direction.

3. The improvement of claim 2, wherein said nozzle means comprises:

at least one nozzle having an entrance opening and an exit opening spaced from said entrance opening with said exit opening being smaller than said entrance opening, said exit opening being located closer to said exit of said passageway than said entrance opening.

4. The improvement of claim 2, wherein said nozzle means comprises:

a plurality of spaced nozzles, each having an entrance opening and an exit opening spaced from said entrance opening with said exit opening being smaller than said entrance opening, said exit opening of each nozzle being located closer to said exit of said passageway than said entrance opening of each said nozzle.

5. The improvement of claim 1, wherein said passageway comprises a disc shaped chamber having an axial opening and a tangential opening, said entrance of said passageway leading to said axial opening and said tangential opening extending to said exit of said passageway.

6. The improvement of claims 1, 2, or 5, wherein:

said passageway is formed in the head of the engine, said entrance and said exit of said passageway extending through said wall of the cylindrical chamber at spaced apart positions.

7. The improvement of claims 1, 2, or 5, wherein:

said passageway is formed in the piston,
said entrance and said exit of said passageway extending through said face of said piston at spaced apart positions.

8. The improvement of claim 1, comprising:
means for producing swirl flow of fluid around the axis of said cylindrical chamber during the intake of said piston,
said entrance of said passageway being located adjacent to the wall of said cylindrical chamber and thus in the high pressure periphery of said swirl and opening upstream so as to intercept said swirl flow whereby fluid is induced into said entrance,
said exit of said passageway being located at the axis of said cylindrical chamber and thus in the low pressure zone of said swirl flow whereby fluid is generally prevented from entering said exit during the compression stroke of said piston.

9. The improvement of claim 8, comprising:
nozzle means located in said passageway pointing in the direction of said exit whereby fluid flow imedpance is low in the direction to which said nozzle means is pointing and high in the opposite direction.

10. The improvement of claim 9, wherein:
said nozzle means is located in said entrance.

11. The improvement of claim 1, comprising:
nozzle means located in said passageway;
said nozzle means, comprising:
at least one nozzle having an entrance opening and an exit opening spaced from said entrance opening with said exit opening being smaller than said entrance opening,
said exit opening being located closer to said exit of said passageway than said entrance opening.

12. The improvement of claim 11, wherein:
said nozzle comprises structure fixed in place in said passageway.

13. The improvement of claim 1, comprising:
nozzle means located in said passageway,
said nozzle means, comprising:
a plurality of spaced nozzles, each having an entrance opening and an exit opening spaced from said entrance opening with said exit opening being smaller than said entrance opening,
said exit opening of each nozzle being located closer to said exit of said passageway than said entrance opening of each said nozzle.

14. The improvement of claim 13, wherein:
said nozzles comprise structure fixed in place in said passageway.

* * * * *